(12) United States Patent
Bosbach et al.

(10) Patent No.: US 11,873,106 B2
(45) Date of Patent: Jan. 16, 2024

(54) CABIN AIR INLET MODULE AND CABIN AIR SYSTEM

(71) Applicants: Deutsches Zentrum fur Luft- und Raumfahrt e.V., Cologne (DE); Diehl Aviation Laupheim GmbH, Laupheim (DE)

(72) Inventors: Johannes Bosbach, Kassel (DE); Tobias Dehne, Einbeck/Dassensen (DE); Felix Werner, Gillersheim (DE); Florian Hesselbach, Blaustein (DE); Norbert Staudigel, Neu-Ulm (DE); Sven Utikal, Burgrieden (DE)

(73) Assignees: DEUTSCHES ZENTRUM FUR LUFT- UND RAMFAHRT E.V., Cologne (DE); DIEHL AVIATION LAUPHEIM GMBH, Laupheim (DE)

( * ) Notice: Subject to any disclaimer, the term of this patent is extended or adjusted under 35 U.S.C. 154(b) by 1134 days.

(21) Appl. No.: 16/574,631

(22) Filed: Sep. 18, 2019

(65) Prior Publication Data

US 2020/0023974 A1    Jan. 23, 2020

Related U.S. Application Data

(63) Continuation-in-part of application No. PCT/EP2018/056828, filed on Mar. 19, 2018.

(30) Foreign Application Priority Data

Mar. 20, 2017 (DE) ..................... 10 2017 105 871.0

(51) Int. Cl.
*B64D 13/08* (2006.01)
*B64D 13/06* (2006.01)
(Continued)

(52) U.S. Cl.
CPC ............. *B64D 13/08* (2013.01); *B64D 13/06* (2013.01); *F24H 9/0057* (2013.01); *F24H 9/02* (2013.01);
(Continued)

(58) Field of Classification Search
CPC .......... H05B 3/20; B64D 13/08; B64D 13/06; B64D 2013/0655; F24H 9/1863;
(Continued)

(56) References Cited

U.S. PATENT DOCUMENTS 1,490,088 A    4/1924   Bridges
2,519,109 A    8/1950   Callender
(Continued)

FOREIGN PATENT DOCUMENTS

DE            103 61 709 B4    8/2008
DE    10 2011 121 053 A1    6/2013
(Continued)

OTHER PUBLICATIONS

International Preliminary Report on Patentability in co-pending, related PCT Application No. PCT/EP2018/056828, dated Sep. 24, 2019.

*Primary Examiner* — Dana Ross
*Assistant Examiner* — Kuangyue Chen
(74) *Attorney, Agent, or Firm* — Thomas | Horstemeyer, LLP

(57) ABSTRACT

The invention relates to a cabin air inlet module (16). The cabin air inlet module (16) comprises a streaming channel body (8). The streaming channel body (8) comprises at least one wall which limits a streaming channel wherein incoming air (5) is supplied to a zone (2) of a cabin (3). The cabin air inlet module (16) comprises an electric heating element (9) which is used for heating the incoming air (5). According to the invention it is proposed that the electric heating element (Continued)

(9) is embodied as a two-dimensional heating element (in particular as a heating paper, a heating web, a heating foil or a heating varnish). The two-dimensional heating element extends along a wall of the streaming channel body (8). The inventive cabin air inlet module (16) is arranged upstream with a small distance (25) from an inlet opening (6) into the zone (2) of the cabin (3). The inventive cabin air inlet module (16) is used for a tempering zones (2) of a cabin (3) of an airplane according to the needs.

35 Claims, 8 Drawing Sheets

(51) Int. Cl.
*H05B 3/20* (2006.01)
*F24H 9/00* (2022.01)
*F24H 9/02* (2006.01)
*F24H 9/1863* (2022.01)
*F24H 3/00* (2022.01)

(52) U.S. Cl.
CPC .............. *F24H 9/1863* (2013.01); *H05B 3/20* (2013.01); *B64D 2013/0655* (2013.01); *F24H 3/002* (2013.01)

(58) Field of Classification Search
CPC .......... F24H 9/02; F24H 9/0057; F24H 3/002; Y02T 50/50
See application file for complete search history.

(56) References Cited

U.S. PATENT DOCUMENTS

| | | |
|---|---|---|
| 4,814,579 A | 3/1989 | Mathis et al. |
| 7,802,732 B2 | 9/2010 | Scherer et al. |
| 2003/0141413 A1 | 7/2003 | Brasseur et al. |
| 2009/0134677 A1* | 5/2009 | Maly .................. B60N 2/5657 |
| | | 297/180.13 |
| 2014/0284314 A1* | 9/2014 | Everth ............... B60H 1/00742 |
| | | 219/202 |

FOREIGN PATENT DOCUMENTS

| | | |
|---|---|---|
| FR | 2 485 473 A1 | 12/1981 |
| WO | 02/36425 A2 | 5/2002 |

* cited by examiner

CABIN AIR INLET MODULE AND CABIN AIR SYSTEM

CROSS REFERENCE TO RELATED APPLICATIONS

This application is a continuation-in-part (CIP) of international application PCT/EP2018/056828 with an international filing date of Mar. 19, 2018 and claiming priority to German Patent Application No. DE 10 2017 105 871.0 entitled "Kabinenluft-Einlassmodul and Kabinenluftanlage", filed on Mar. 20, 2017.

FIELD OF THE INVENTION

The invention relates to a cabin air inlet module which can be used in a cabin air system of an aircraft as a passenger airplane in the region of an inlet for cabin air into a zone of a cabin of the aircraft. The cabin air inlet module can be assembled with the original equipment of the aircraft or might be used for retrofitting an existing aircraft. However, it is also possible that the cabin air inlet module is used in the region of an inlet for incoming air for a cabin of a personal car, a commercial vehicle, a bus or a railway vehicle. Furthermore, the invention relates to a cabin air system comprising a cabin air inlet module.

BACKGROUND OF THE INVENTION

According to the publication DE 103 61 709 B4 corresponding to U.S. Pat. No. 7,802,732 B2 it is known to divide a cabin of an airplane into single spatial zones wherein in each of them then a control of the temperature of the incoming air supplied to the cabin (in the following "incoming air") can be provided. For that purpose a mixing valve is associated with each zone. On the one hand ventilation air taken from a mixing chamber is supplied to all of the mixing valves. On the other hand, hot bleed air from the engine is supplied to the mixing valves. The valve positions of the mixing valves are then individually controlled for each mixing valve with respect to the addition of hot bleed air dependent on the temperature in the associated zone of the cabin which is sensed by a temperature sensor. For the individual control of all of the mixing valves a central cabin temperature controller is used.

This known solution is in DE 103 61 709 B4 criticized because for each zone of the cabin of the airplane a specific mixing valve is required and a conduit for ventilation air as well as a conduit for bleed air from the engine has to be installed to each mixing valve and in some cases for security reasons also for each mixing valve an installation of a monitoring device for a leakage of heated air can be required.

On this background DE 103 61 709 B4 proposes a central mixing valve which is responsible for a plurality of spatial zones of the cabin of the airplane. The mixing valve mixes bleed air from the engine with air being colder than the bleed air from the engine. Here, the central mixing valve is controlled such that the mixed air pre-tempered by the central mixing valve comprises a temperature which corresponds to the lowest desired temperature of all zones of the cabin connected to the mixing valve. The mixed air pre-tempered in such a way and provided by the mixing valve is then supplied by parallel conduits to the zones of the cabin. For individually increasing the temperature in single zones it is possible that heating devices are arranged in the conduits by which the mixed air pre-tempered by the mixing valve is supplied to the zones. The heating power of the heating devices is individually controlled such that the mixed air pre-tempered by the mixing valve is heated with the aim that the desired temperatures result in each of the zones of the cabin of the airplane. In DE 103 61 709 B4 it is mentioned that an advantage of this solution is that (when compared to the above prior art) the number of required mixing valves is reduced and also the number and the links of the required conduits for transmitting the bleed air from the engine is reduced. Furthermore, DE 103 61 709 B4 proposes to arrange the heating device close to the inlets into the spatial zones of the cabin of the airplane. Here, the heating devices should be embodied as electric heating elements in the shape of heating spirals where the pre-tempered mixed air is able to stream through the heating spiral. By a sensor it is possible to sense the temperature of the incoming air supplied to the respective zone of the cabin at a location downstream from the heating device. Additionally, downstream from the mixing valve and upstream from the heating elements a sensor might sense the temperature of the pre-tempered mixed air. In a control device a characteristic of the respective zones of the cabin can be considered. The sensors, heating devices and the control devices might communicate with each other by one or a plurality of data buses. It is possible that a higher-level central control device interacts with decentralized control devices each associated with the heating elements. In this case the signals of the sensors which sense the temperature in the zones and the signals of transmitters by which a desired temperature in the zones can be set can be transmitted to the associated decentralized control devices.

US 2003/0141413 A1 cares for the specific requirements of the tempering of the incoming air in resting zones of the staff in an airplane. Here, a heating device of the company Goodrich Aerospace with the label PN 4E3239-1 is used which is used for providing an efficient heat transfer to the incoming air without restraining the stream of air.

Further prior art is known from FR 2 485 473 A1.

WO 02/36425 A2 discloses a heating device for an airplane which can be arranged in a central air channel in the floor region of the airplane and can be arranged upstream of a plurality of outlets arranged along the longitudinal direction in the floor region of the airplane. By the heating device the thermal conditions for the staff, the passengers and the devices can be changed. Outlets can be arranged in the region of the toilets, the passenger seats, the cockpit, the cargo compartment or in other regions. The heating device arranged in the supply channel for the cabin air comprises a fan assembly for conveying the cabin air as well as an elongate heating spiral arranged downstream of the fan assembly. The heating spiral comprises an outer cylindrical tube, a leaf-shaped or plate-shaped composite material wound spirally around the longitudinal axis of the tube as well as holding elements extending radially in the inlet region of the heating spiral. By means of the holding elements the composite material is held at the tube and the spiral-shaped configuration of the composite material in the cross section is upheld. Due to the fact that the spirally wound composite material does not extend up to the longitudinal axis of the tube, within the heating spiral a free transfer cross section remains. In WO 02/36425 A2 the free transfer cross section is described to be generally cylindrical. Radially outside from the cylindrical free transfer cross section in the cross section spirally shaped transfer pathes for the cabin air are provided which have a constant radial extension. The composite material consists of a carrier layer as well as insulation layers between which an electric heating element is accommodated in a sandwich-like way. When cabin air streams along the outer surfaces of the composite material the electrically generated heat of the heating element is transmitted by convection to the cabin air. The heating element might comprise an etching metal layer (e.g. etched 302 stainless steel, Inconel 600 (registered trademark), a copper alloy, Konstantan (registered trademark) or any other electrically conductive material). It is also possible to use a resistance heating wire as the heating element. The insulation layers might consist of the same or different materials, e.g. fiberglass/epoxy, fiberglass/silicone or Kapton (registered trademark). The heating spiral is manufactured by etching of the electrically conductive layer and layer-wise composition of the composite material. Additionally, a shaping layer is manufactured. The contour of the layer thickness of the shaping layer corresponds to the change of the heights of the spiral-shaped streaming channels. The shaping layer and the composite material are then rolled to together a cylindrical role on a cylindrical core without establishing any intermediate spaces. After the hardening of the composite material in an oven and autoclave the cylindrical core and the shaping layer are removed. Further embodiments described and shown in WO 02/36425 A2 relate to heating spirals having a changing heights of the spiral-shaped transfer pathes and/or a varying density of heating wires of the heating elements along the spiral-shaped cross section of the heating spiral.

The publication U.S. Pat. No. 1,490,088 A (that does not form pertinent prior art) relates to a drying device in the sanitary field or to applications wherein a drying effect shall be produced by a stream of dried air. The drying device comprises a blower having an outlet nozzle. An insulating ring is screwed into the outlet nozzle. In the inlet region the insulating ring comprises flattenings being arranged on opposite sides when seen in the cross section. Electrical plugs are mounted in the region of the flattenings. The plugs comprise fork-like accommodations. Contact elements of a heating spiral can be releasably arranged in the accomodations. The heating spiral is covered by an insulating and protecting cover. A resistance core extending along the outlet nozzle is held at the cover. The resistance core consists of two sheets of mica arranged in a cross-like shape. The radial extension of one sheet of mica reduces from the blower to the outlet opening whereas the radial extension of the other sheet of mica increases in this direction. Accordingly, on the side associated with the blower the first mentioned sheet of mica extends over the whole cross section of the streaming channel whereas in the region of the outlet opening this sheet of mica extends only over a part of the cross section. The same applies for the other sheet of mica in reversed direction. A resistance wire is wound in streaming direction spirally about the sheets of mica so that in each of the quarter circle segment shaped streaming channels which are limited by the sheets of mica the resistance wire is offset with varying inclination angles.

U.S. Pat. No. 4,814,579 A discloses a generally closed cabin air circuit wherein the cabin air is circulated between a central outlet and a central inlet. In the closed circuit a cooling unit is driven by an engine of a right wing whereas a resistance based electric heating device is supplied with power by an engine of the left wing. The central inlet for the cabin air tempered in this way is arranged in the middle between a front seating row and a middle seating row. Fresh air taken in the region of a nose of the airplane can be added to the circuit. A control of the amount of fresh air is provided by a throttle valve. In an inner tube which is streamed through ceramic supporting plates are arranged and held. The supporting plates have an orientation parallel to each other and extend in streaming direction. Between the ceramic plates ceramic rods extend having an orientation transverse to the streaming direction. The ceramic rods are again connected to ceramic coil holders. The coil holders comprise recesses wherein heating spirals are arranged. It is also possible that a temperature switch is arranged in the inner tube. The temperature switch deactivates the supply of power to the heating spirals when a predefined temperature is reached.

The present invention in particular bases on the object to propose a cabin air inlet module and a cabin air system which is in particular improved with respect to
the tempering of the incoming air in a zone of a cabin according to the needs,
the mixing of the incoming air and the cabin air in a zone of the cabin,
the homogeneity of the temperature distribution,
the effort for the installation of lines and conduits,
the velocity of the heating of the cabin air in a zone of the cabin,
the efficiency
the expenditure in manufacturing
the weight and/or
the consideration of different operating parameters and environmental parameters for the tempering of the incoming air and the cabin air.

SUMMARY OF THE INVENTION

The invention proposes a cabin air inlet module. A " . . . module" is understood to be a technical unit which can be assembled with other units to a functioning assembly group. Accordingly, in this sense it is possible to combine the cabin air inlet module with other components of the cabin air system in particular of the aircraft to a functioning cabin air system. The cabin air inlet module can be one piece or might consist of an assembly group of a plurality of components which can be assembled with each other, can form a module part or might be combined in any other different way to a singular constructional unit.

The novel cabin air inlet module can be arranged in an inlet region for incoming air into the cabin (e.g. a zone of the cabin) which also covers that the cabin air inlet module is arranged upstream from an inlet opening into the cabin with a distance of less than 1.5 m, 1 m or 50 cm.

The cabin air inlet module comprises a streaming channel body. In the streaming channel body the incoming air streams towards the cabin or a zone of the cabin. The streaming channel body comprises at least one wall. This wall delimits at least one streaming channel of the streaming channel body. In the streaming channel the wall guides incoming air which is supplied to a cabin (or a zone of the cabin).

Furthermore, the cabin air inlet module comprises an electric heating element. By means of the heating element the incoming air is heated. Accordingly, the invention does not follow the often used solution that the incoming air supplied to the cabin is tempered only by a control of the volumetric stream of bleed air of the engine admixed by a mixing valve. Instead, according to the invention the incoming air is (also) heated by an electric heating element.

Electric heating elements known from the prior art are embodied as heating spirals where in this case the heating spiral is arranged in the stream of the incoming air. A disadvantage of this solution is that the heating spiral arranged in the stream of the incoming air in an undesired way influences the stream of the incoming air which might e.g. leads to undesired turbulences and/or an undesired throttling of the stream of the incoming air by the heating spiral. It is also possible that contaminations of the incoming air are deposited at the heating spiral so that in the course of time the streaming conditions change. It is also possible that, deposited contaminations are burned and lead to odor problems of the incoming air.

On this background one embodiment of the invention proposes that the electric heating element is embodied as a two-dimensional heating element which extends along the wall. Due to fact that the wall guides the incoming air, by means of the electric heating element embodied as a two-dimensional heating element an efficient heating of the incoming air can be provided.

For the arrangement and/or connection of the electric heating element in the region of the wall there are a lot of options. For one embodiment of the invention the electric heating element contacts the wall two-dimensionally or with an area. This might be the case on the side of the wall facing towards the stream of the incoming air so that the electric heating element is able to directly emit heat to the streaming incoming air. It is also possible that the electric heating element contacts the side of the wall facing away from the stream of the incoming air so that the heat of the electric heating element approaches the streaming incoming air through the wall. Here, the contact of the electric heating element with the wall is preferably two-dimensional or there is a contact area. It is also possible that a suitable contact means as a heat transferring contact layer, an adhesive and the like is arranged between the heating element and the wall. It is also possible that the electric heating element is directly fixed at the wall which might be provided by any fixing means as screws, adhering and the like. Furthermore, it is possible that the electric heating element is embedded into the wall. Here, it is e.g. possible that the wall is directly injection molded or cast in an injection molding process or a casting process to the electric heating element. An "embedding" here might be a connection with the wall with a material bond where the electric heating element on one side of the wall might protrude or "peek out" of the wall. It is also possible that the embedding is provided by arranging the electric heating element completely within the wall so that at all locations or in the essential regions material of the wall is arranged between the heating element and the streaming incoming air.

Within the frame of the invention it is possible that the streaming channel body comprises any cross section with at least one single streaming channel or a plurality of streaming channel subsections. For one embodiment of the invention the streaming channel body on the one hand comprises a streaming tube which forms a wall. The incoming air is guided within the wall. Without this necessarily being the case in the region of the wall the streaming tube might also comprise an electric heating element being embodied as a two-dimensional heating element. Furthermore, the streaming channel body comprises at least one guiding element which is arranged in the inner cross section of the streaming tube and which forms a (additional) wall. Additionally or alternatively to an electric heating element arranged in the region of the streaming tube a two-dimensional electric heating element can be arranged in the region of the guiding element. The guiding element serves for guiding the incoming air according to the needs. For a non-limiting example by means of the guiding element it might be possible to intentionally induce turbulences of the incoming air in order to achieve a more homogenous distribution of the incoming air heated by the electric heating element in the streaming cross section. It is also possible that by means of the guiding element already a streaming component is generated which is desired in the region of the inlet opening into the cabin in order to provide the desired flow of the incoming air through the cabin or the zone of the cabin. In some cases when equipping both the wall of the streaming tube as well as the wall of the guiding element with a two-dimensional electric heating element, the heated area which interacts with the stream of the incoming air can be increased which provides the option of increasing the amount of heat transferred to the volumetric flow of the incoming air which again results in a faster heating of the incoming air.

As mentioned above the orientation and contouring of the guiding element might be arbitrary. It is e.g. possible that in a cross section of the streaming channel body the guiding element has an orientation transverse to a longitudinal axis of the streaming channel body and/or starting from from a wall of the streaming tube has an orientation in radial inner direction towards to the longitudinal axis. In this case a wall formed by the guiding element might have an extension in a longitudinal plane of the streaming channel body or this wall extends with a spiral shape or the shape of a helix about the longitudinal axis of the streaming channel body.

The guiding element and the wall forming the guiding element might e.g. extend over the whole longitudinal extension of the streaming channel body, over more than 50% of the longitudinal extension of the streaming channel body or more than 5 cm, more than 10 cm, more than 20 cm, more than 30 cm or even more than 40 cm along the longitudinal extension of the streaming channel body.

For a particular proposal of the invention at least one guiding element arranged in the inner cross section of the streaming tube (and accordingly for some embodiments also any associated heating element) has the shape of a spiral or a helix.

Here, the spiral shape or the shape of the helix of the guiding element might extend over the whole cross section of the streaming tube so that the whole incoming air streaming through the streaming tube is forced to move spirally or helically as defined by the guiding element. However, in some cases it might also be advantageous that within the spirally shaped or helically shaped guiding element a free transfer cross section is provided. Accordingly, for a projection of the streaming tube with the guiding element along the longitudinal axis in a transverse plane an internal free transfer cross section is provided which might e.g. be circular. It has shown that for some embodiments when using a free transfer cross section of this type the stream of the incoming air through the cabin air inlet module is separated into a partial stream which is spirally or helically guided by the guiding element as well as into a partial stream which is able to stream coaxially to the streaming tube through the free transfer cross section without substantial redirections by the guiding element. It is possible that the free transfer cross section leads to a reduced throttling effect. However, alternatively or cumulatively it is also possible that the free transfer cross section leads to a better mixing by turbulences of the incoming air guided by the cabin air inlet module with a more homogeneous temperature distribution resulting therefrom.

It is possible that by means of a guiding element (preferably by means of two guiding elements) at least two streaming channel subsections of the cabin air inlet module are separated from each other. Here, it is possible that in a cross section of the streaming channel body the streaming channel subsections are completely separated from each other so that it is not possible that incoming air transits between the streaming channel subsections in the cross section. However, it is also possible that the streaming channel subsections are only separated from each other in circumferential direction which is preferably the case in the radial outer region of the streaming channel whereas at least in one other direction a transition of incoming air is possible between the streaming channel subsections which might e.g. be the case at the radially interior free transfer cross section.

In the case that in the region of a guiding element separating streaming channel subsections from each other or in the region of more than one guiding element used for this purpose an electric heating element is arranged, the electric heating element might be used in a multifunctional way by using the electric heating element for heating of incoming air in both streaming channel subsections separated by the at least one guiding element.

It is generally possible that the streaming tube comprises a wall being continuous in circumferential direction. However, for another proposal of the invention a plurality of tube segment parts extending in axial direction of the cabin air inlet module are used which together combine to the desired cross section of the cabin air inlet module. This might as an example be explained for tube segment parts having a quarter-circular cross section (or a cross section according to any part of a circle). Here, the tube segment parts each comprise radial walls which are offset in the cross section by 90° for the given example and which can be connected to each other in the region of the inner ends or might also not be connected to each other. Furthermore, the tube segment parts comprise outer walls having the shape of a quarter circle and which connect the radial outer ends of the radial walls. Four tube segment parts of this type can be connected to each other in a way such that these combine to a tube body having a cylindrical outer surface wherein then the tube segment parts each delimit a streaming channel subsection. Here, the streaming tube is then formed by the outer surfaces or walls of the tube segment parts whereas the radial walls form guiding elements. In this case for one possible embodiment electric heating elements can be arranged between adjacent radial walls of adjacent tube segment parts. It is possible that in the region of the streaming tube formed by the outer surfaces of the tube segment parts alternatively or cumulatively at least one electric heating element is arranged.

It is possible that the supporting structure of the cabin air inlet module is mainly or exclusively formed by the afore mentioned tube segment parts. For an alternative proposal the tube segment parts are arranged in a covering body which connects the tube segment parts with each other and/or which contribute to the rigidity of the cabin air inlet module and provide the option for connecting the cabin air inlet module to adjacent components. It is also possible that an electric heating element is arranged between the at least one tube segment part and the covering body.

For another proposal a heating element is arranged between two walls. Here, it is possible that the heating element only contacts the wall or that the heating element is linked by a material bond to the at least one wall leading in some cases to an improved transmission of heat.

It is furthermore possible that a heating element is arranged between a tube segment part and a covering body. Also in this case the heating element might contact the tube segment part and/or the covering body or might be connected by a material bond thereto.

For the components of the cabin air inlet module (in particular a guiding element, a streaming tube, a tube segment part) any material can be used which is preferably selected under consideration of the temperature resistance, a provision of a good transfer of heat and a provision of the required mechanical strength. For another proposal the streaming channel body, a streaming tube and/or a tube segment part are/is manufactured with or from an extruded polycarbonate material.

For the connection of single components or constructional elements of the cabin air inlet module with each other there are a lot of options. It is e.g. possible that a screwing, riveting, welding or any other detachable or non-detachable joining technique is used. For another inventive embodiment of the cabin air inlet module the constructional elements of the cabin air inlet module are partly or completely connected to each other by material bonds. Here, a connection might e.g. be provided by casting or by an adhesive connection or a connection under use of a material bond with the use of epoxy resin.

For the technical design of the electric heating element there are a lot of options. It is also proposed that the electric heating element is embodied as a heating mat. A heating mat of this type is e.g. understood to be a heating web, a heating foil or a heating paper and the like. A heating mat of this type might in some cases be adapted to a contour of a wall of a cabin air inlet module or might extend between single walls in a straight form or in an angled shape. However, alternatively or cumulatively it is possible that the heating element is embodied as a heating varnish.

For an inventive embodiment a heating mat used for the electric heating element might be covered with a material or embedded into a material which has an insulation against electrical breakdown of at least 500 V. A use of a material of this type has shown to be advantageous with respect to the safety against electrical breakdown so that in some cases also additional measures for providing the safety against electrical breakdown of the cabin air inlet module are dispensable or the requirements for these additional measures can be reduced.

Furthermore, an embodiment is proposed wherein the streaming channel is covered by an insulating material. Here, the insulating material might be used for at least reducing the transportation of heat from the cabin air inlet module in order to avoid an undesired heating of the neighborhood of the cabin air inlet module and also in order to increase the efficiency of the cabin air inlet module which is due to the fact that by use of the insulating material the percentage of heat of the electric heating element transferred to the incoming air is increased. Cumulatively or alternatively it is possible that the insulating material also serves for a noise insulation and/or an insulation of mechanical oscillations due to the streaming incoming air.

For the extension of the heating element in the streaming channel body and along the same there are a lot of options. For a particular proposal the heating element extends in and/or along the streaming channel body over a length in the region of 20 mm to 200 mm (preferably in the region of 50 mm to 150 mm or in the region of 70 mm to 140 mm). A dimensioning like this has shown to be a good compromise one the one hand with respect to a compact constructional size and a reduction of the costs of the heating element and on the other hand for an efficient heating of the incoming air to the required extend.

It is generally possible that the cabin air inlet module comprises only the heating element (with the associated connectors) as an electric constructional element. For another proposal the cabin air inlet module additionally comprises a sensor. Here, the sensor might measure any physical quantity. In order to mention only some options, by means of the sensor a volumetric flow of the incoming air, a flow by weight of the incoming air, a streaming velocity of the incoming air, a pressure of the incoming air in the cabin air inlet module and/or a temperature of the heating element or of the incoming air in the cabin air inlet module (here with an arrangement upstream and/or downstream from the heating element) is sensed.

It is generally possible that the cabin air inlet module is embodied as a "passive constructional unit" without any controlling electronics (which covers both a closed loop control as well as an open loop control). However, for one inventive embodiment of the cabin air inlet module comprises an electronic control unit. The electronic control unit provides a control of the electric bias of the heating element under consideration of a signal of a temperature sensor (which might be a component of the cabin air inlet module or might be arranged outside from the cabin air inlet module, in particular in the cabin or a zone of the cabin). The control is here provided in a way such that if possible in the cabin or in the inlet air streaming out of the cabin air inlet module a desired temperature (which in particular is constant or changing and/or is manually set by a passenger in the zone or automatically set by the or another control unit) is achieved and/or upheld.

For another embodiment of the cabin air inlet module the cabin air inlet module comprises a port. For one embodiment the port serves for connecting the control unit to a cabin management control unit for defining the desired temperature. Here, the cabin management control unit might automatically determine a desired temperature on the basis of suitable algorithms. It is also possible that the cabin management control unit processes manual external demands e.g. of a passenger in the zone of the cabin to which the cabin air inlet module is associated.

In a further embodiment by the or a port it is possible to connect the cabin air inlet module to a sensor which is arranged in a zone of the cabin which is supplied with incoming air by the cabin air inlet module.

For the kind of any control of the temperature of the incoming air there are a lot of different options. For one inventive proposal a binary ON-OFF-control of the heating element is used. In this case the control unit integrated into the cabin air inlet module or an external control unit might comprise control logic by which the ON-OFF-control of the heating element is provided. It is also possible that the cabin air inlet module only comprises an ON-OFF-switching element (in particular a switching relay) which is controlled by an internal or external control unit for the ON-OFF-control of the heating element.

However, it is also possible that the control unit comprises control logic for a PID control of the heating element.

For a further embodiment the control logic of the control unit considers further operating parameters and environmental parameters. Here, it is possible that the control logic performs a control which
- processes a signal of a seat occupation sensor so that it is possible to consider if a seat is (temporarily or during the whole flight) occupied or not occupied,
- considers a seat occupation distribution by which seats occupied during the flight and remaining free seats can be considered, considers a signal of an infrared camera monitoring the zone of the cabin associated with the cabin air inlet module,
- considers a signal from a fitness detection device and/or health detection device of a passenger and/or
- considers a manual temperature demand from a passenger.

For another solution of the object of the invention in a cabin air system a plurality of cabin air inlet modules is used. Here, respective cabin air inlet modules are each associated each with a respective zone of a cabin of an airplane. The cabin air inlet module is positioned under a distance from an inlet opening into the associated zone which is smaller than 150 cm, smaller than 100 cm, smaller than 50 cm or even smaller than 30 cm. Specific control units are each associated to the respective cabin air inlet modules where it is also possible that the control unit is a component of the cabin air inlet modules. These control units of the cabin air inlet modules each communicate with a central control unit of a cabin management system which is arranged at a central position of the airplane.

For the kind of the communication there are a lot of options. Here, only some of the options are mentioned without a limitation of the invention to these examples being intended:
- It is possible that the central control unit transmits the same or different desired temperatures to the control units of the cabin air inlet modules, the desired temperature than being considered by the control by the control unit which is associated to the specific cabin air inlet module or integrated into the same.
- It is possible that in the central control unit a control signal for a heating element of the cabin air inlet module is determined which is then transmitted from the central control unit to the control unit which is associated with the respective cabin air inlet module or integrated into the same.
- It is possible that the central control unit and the control unit of the cabin air inlet module exchange measurement signals, in particular measurement signals of a temperature sensor which senses the temperature of the incoming air streaming through the cabin air inlet module.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if a wall or a heating element is mentioned, this is to be understood such that there is exactly wall or heating element or there are two walls or heating elements or more walls or heating elements. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

Figure 1:
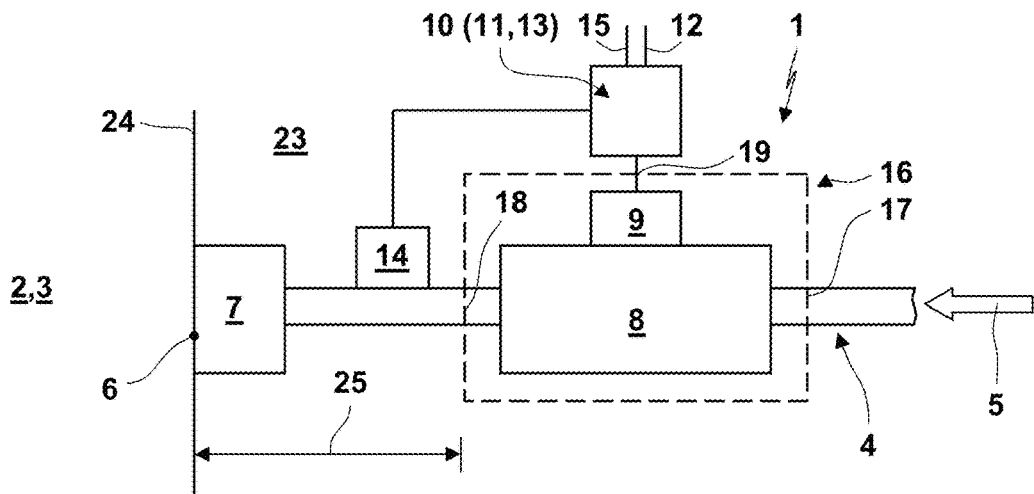
FIGS. 1 to 6 very schematically show different embodiments of a cabin air inlet module and its integration into a cabin air system.

In the following description of the figures constructional elements and features which correspond to each other with respect to the design and/or function are partly labeled with the same reference numerals. If in a figure the same constructional elements or functions are labeled with the same reference numeral, these can be distinguished with the additional letters a, b, . . . . In this case reference can be made to these constructional elements or functions with or without the use of the additional letter a, b, . . . .

Generally a cabin air system 1 comprises a cabin zone conduit branch 4. Incoming air 5 is supplied to the cabin zone conduit branch 4 which is supplied via an inlet opening 6 into the zone 2 of the cabin 3. Here, incoming air 5 designated for the zone 2 might be processed separately for each zone 2 or the incoming air 5 is provided for different zones 2a, 2b, . . . via a central conduit which then branches to the single cabin zone conduit branches 4a, 4b, . . . . In the central conduit the incoming air 5 might be centrally pre-tempered which might be provided by any heating or mixing device where preferably a temperature of the incoming air 5 is provided in the central conduit which corresponds to the lowest desired temperature in the zones 2a, 2b or differs by a predefined amount from the lowest desired temperature in the zones 2a, 2b.

Optionally the cabin zone conduit branch 4 might comprise an inlet device 7 forming the inlet opening 6. This inlet device 7 might e.g. be a throttle, aperture, closing device or guiding device which can be manually adjusted by a passenger or which can be electronically adjusted. Also a so-called individual nozzle can be used for the inlet device. It is alternatively or cumulatively possible that an inlet device 7 is used which cannot be manipulated by the passenger where in this case the inlet opening 8 might be open or covered or might not be visible for the passengers. A streaming channel body 8 is arranged upstream from the inlet opening 6 or inlet device 7. Incoming air streams through the streaming channel body 8. In the region of the streaming channel body 8 at least one heating element 9 is arranged by which it is possible to heat the streaming channel body 8 and/or the incoming air 5 which streams through the streaming channel body 8 dependent on the electric bias of the heating element 9. A (open loop or close loop) control of the electric heating element 9 or the controlled electric bias of the same is provided by a control unit 10. It is possible that the control unit 10 is embodied as a switching device or switching relay 11. The switching devise or switching relay 11 activates or deactivates by means of an ON-OFF-control or also in a plurality of steps or without steps an electric bias of the heating element 9 leading to a control of the heat applied by the heating element 9 to the incoming air 5. It is possible that a switching of the switching device or the switching relay is provided by a control line 12. The control signals for the control lines 12a, 12b, . . . for different zones 2a, 2b, . . . can be controlled by a central cabin management system in such a way that the desired temperatures are achieved in the zones 2a, 2b, . . . . However, it is also possible that the control unit 10 is an electronic control unit 13 wherein the control algorithm is executed. In this case it is possible that a desired temperature manually set by the passenger or set by a central cabin management system is transmitted via the control line 12 to the electronic control unit 13. On the basis of this desired temperature then the electric bias of the heating element 9 is controlled by the electronic control unit 13. In order to allow a closed-loop control it is possible to transmit the signal of a temperature sensor 14 to the electronic control unit 13. Here, the temperature sensor 14 might sense the temperature in the region of a wall of the cabin zone conduit branch 4 so that the temperature of the incoming air 5 is only indirectly sensed or the temperature sensor 14 is directly arranged in the streaming incoming air 5 so that the temperature of the incoming air is directly sensed. It is possible that the temperature sensor 14 is arranged downstream of the streaming channel body 8 and the heating element 9, in particular between the streaming channel body 8 and the inlet opening 6 or the inlet device 7. By at least one additional line 15 the control unit 10 can be supplied with electric power, further control signals, measurement signals and the like. For a non-limiting example it might be possible that by the line 15 define the desired temperature in the zone 2 is manually defined by the passenger and/or a temperature signal which is measured in the zone 2 is transmitted to the control unit 10.

The FIGS. 1 to 6 show different combinations of the single mentioned constructional elements of the cabin air system 1 to a cabin air inlet module 16 being possible within the frame of the invention without a limitation to the shown embodiments being intended:

According to FIG. 1 only the streaming channel body 8 and the heating element 9 are combined to the cabin air inlet module 16. In this case the cabin air inlet module 16 comprises a cabin air inlet 17 and a cabin air outlet 18. By means of the cabin air inlet 17 and the cabin air outlet 18 it is possible to integrate the cabin air inlet module 16 into the cabin zone conduit branch 4. It is possible that the cabin air inlet 17 and the cabin air outlet 18 comprise common releasable ports or flanges. However, it is also possible that the cabin air inlet 17 and the cabin air outlet 18 are integrally integrated into the cabin air conduit branch 4 and e.g. connected to the connected conduits by a material bond. Furthermore, for the embodiment shown in FIG. 1 the cabin air inlet module 16 comprises an electric port 19 by which the heating element 9 is electrically biased.

Figure 2:
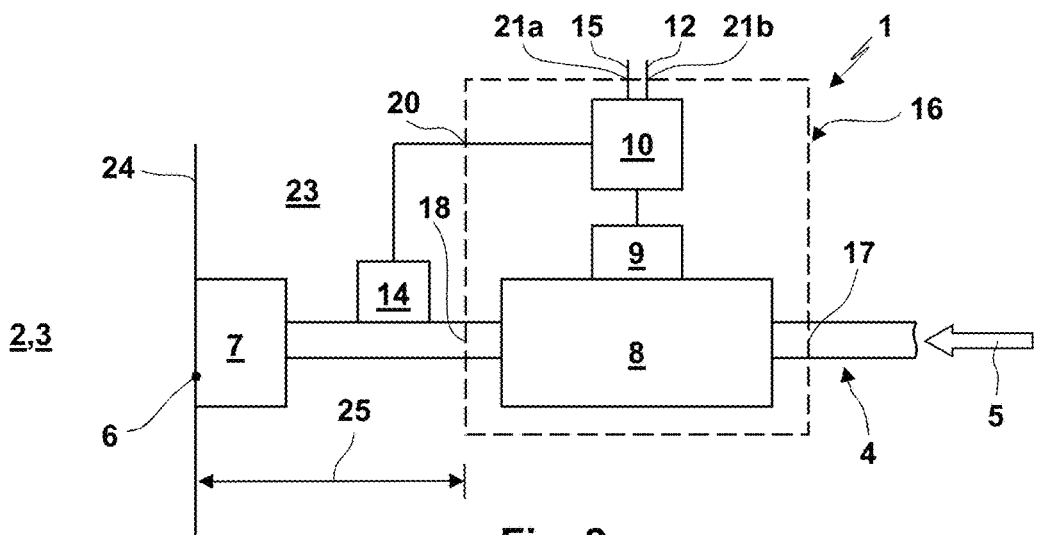

For the embodiment shown in FIG. 2 the streaming channel body 8, the heating element 9 and the control unit 10 are integrated into the cabin air inlet module 16. Also here the cabin air inlet module 16 comprises a cabin air inlet 17 and a cabin air outlet 18. Furthermore, the cabin air inlet module 16 comprises a port 20 by which is possible to transmit a measurement signal of the temperature sensor 14 to the cabin air inlet module 16 and to the control unit 10. Furthermore, the cabin air inlet module 16 comprises ports 21a, 21b, . . . by which it is possible to connect the cabin air inlet module 16 and the control unit 10 to the control line 12 (and so e.g. to a cabin management system) and to a line 15 (in particular for transmitting a measurement signal of a temperature sensor arranged in the zone 2 or for transmitting a manual demand of a desired temperature by a passenger).

Figure 3:
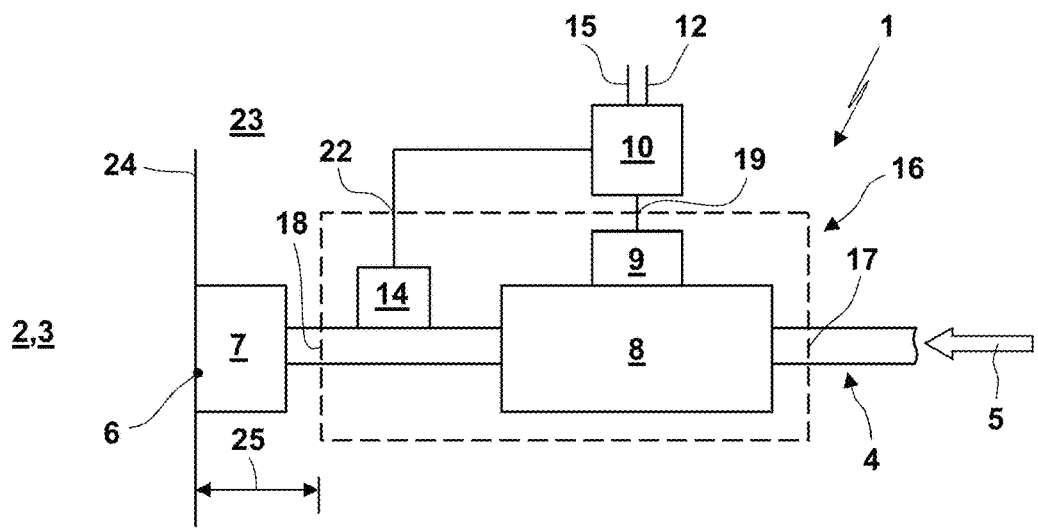

For the embodiment shown in FIG. 3 the cabin air inlet module 16 generally corresponds to the cabin air inlet module 16 of FIG. 1. However, here also the temperature sensor 14 is integrated into the cabin air inlet module 16. In this case the cabin air inlet module 16 comprises a port 22 by which the measurement signal of the temperature sensor 14 is transmitted to the outside of the cabin air inlet module 16 in order to transmit the measurement signal outside from the cabin air inlet module 16 to the control unit 10.

Figure 4:
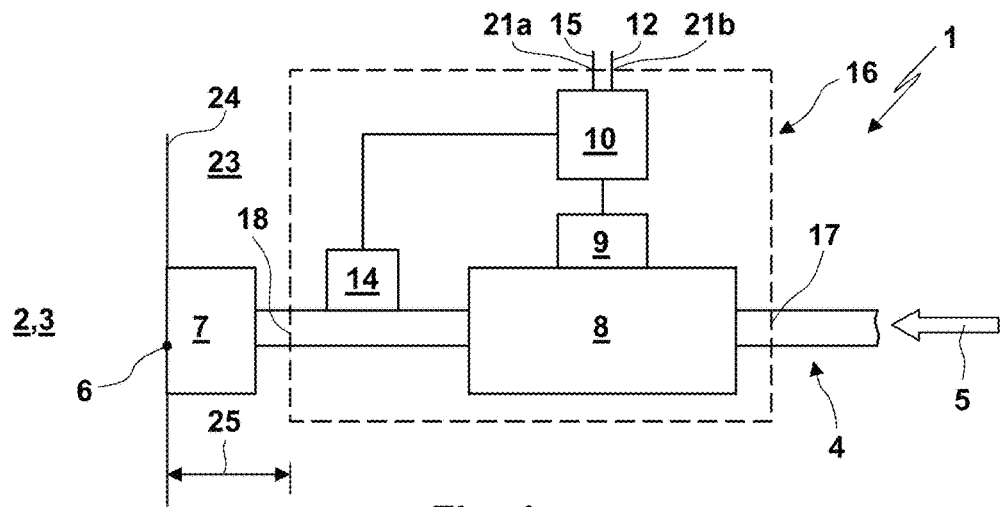

FIG. 4 shows an embodiment wherein the streaming channel body 8, the heating element 9, the control unit 10 and the temperature sensor 14 are integrated into the cabin air inlet module 16. The cabin air inlet module 16 solely communicates with the environment via the cabin air inlet 17 and the cabin air outlet 18 as well as a port 21a for the line 15 as well as a port 21b for the control line 12.

Figure 5:
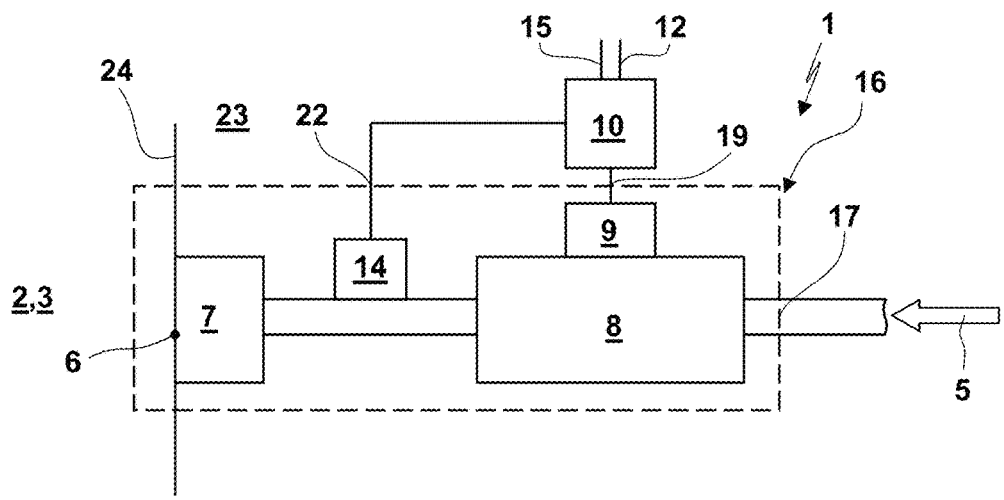

For the embodiment of FIG. 5 the inlet device 7 comprising the inlet opening 6, the streaming channel body 8, the heating element 9 and the temperature sensor 14 are integrated into the cabin air inlet module 16. In this case the cabin air inlet module 16 communicates with the environment on the one hand via the cabin air inlet 17 and the inlet opening 6 by an exchange of incoming air 5. In this case electric ports the cabin air inlet module 16 are only the port 22 for the transfer of the measurement signal of the temperature sensor 14 as well as the port 19 for the electric bias of the heating element.

Figure 6:
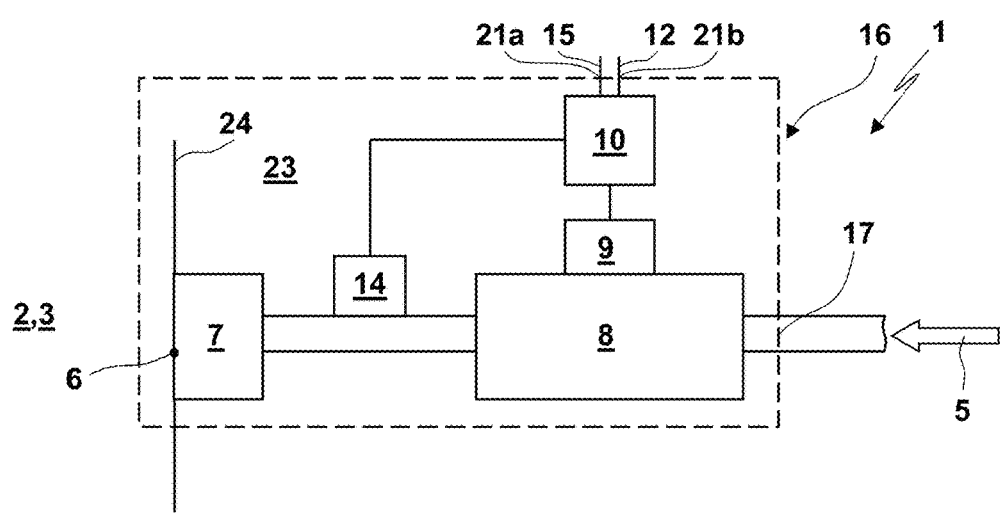

For the embodiment of the cabin air inlet module 16 shown in FIG. 6 the inlet opening 6, the inlet device 7, the temperature sensor 14, the streaming channel body 8, the heating element 9 and the control unit 10 are integrated into the cabin air inlet module 16. The incoming air 5 is transmitted to the cabin air inlet module 16 via the cabin air inlet 17 whereas the incoming air 5 leaves the cabin air inlet module 16 via the inlet opening 6. As electric ports the cabin air inlet module 16 here only comprises the ports 21a, 21b for the connection to the control line 12 and the line 15.

For the shown embodiments the inlet opening 6, any inlet device 7, any cabin air conduit between the inlet opening 6 respectively the inlet device 7 and the cabin air inlet module 16 and the cabin air inlet module 16 are integrated in a wall region 23 which is separated by a wall 24 from the zone 2.

For the embodiments of FIGS. 1 to 4 wherein the cabin air inlet module 6 does not directly form the inlet opening 6 the distance 25 of the cabin air inlet module 16 from the inlet opening 6 and so the length of the path of the incoming air 5 from the cabin air inlet module 16 into the zone 2 is preferably smaller than 150 cm, smaller than 100 cm, smaller than 50 cm or even smaller than 30 cm or 20 cm.

Figure 7:
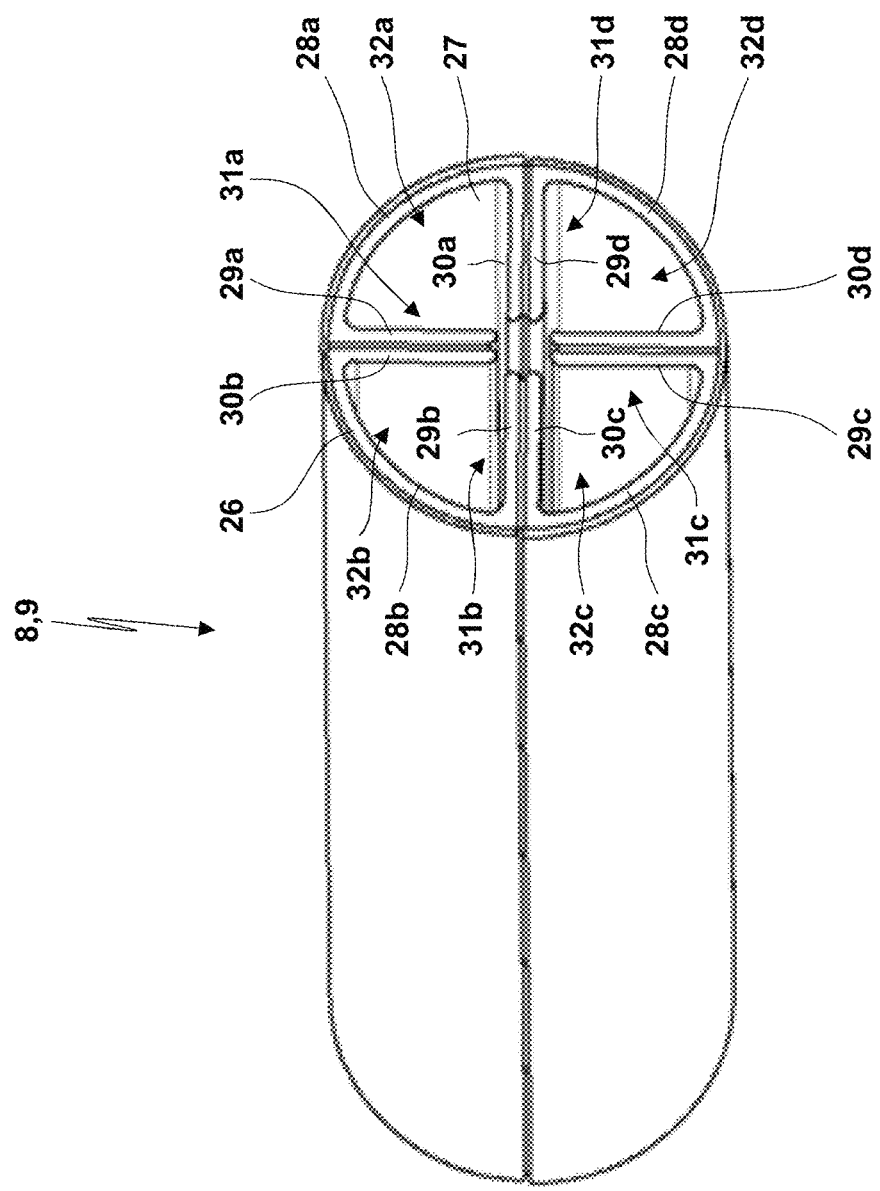
FIG. 7 in a three-dimensional view shows a cabin air inlet module comprising a streaming channel body with guiding elements and heating elements.

FIG. 7 in a three-dimensional view shows a streaming channel body 8. The streaming channel body 8 comprises a streaming tube 26 having a generally ring-circular cross section which delimits a circular inner cross section 27 through which the incoming air 5 streams. Here, the streaming tube 26 is not formed with a continuous hollow-cylindrical wall but with four walls 28a, 28b, 28c, 28d which each correspond to a quarter segment of a hollow cylinder.

Four couples of walls 29, 30 being arranged directly adjacent to each other extend in radial inner direction from the streaming tube 26. Each of these couples of walls 29, 30 forms a guiding element. By the guiding elements 31 the incoming air 5 is guided within the inner cross section 27. The guiding elements 31 separate four streaming channel subsections 32 from each other.

Heating elements 9 extend along the walls 28, 29, 30. The heating elements 9 are embodied as two-dimensional heating elements 33. For the embodiment of FIG. 7 the two-dimensional heating elements 33 have a two-dimensional area that corresponds to that of the walls 29, 30. The two-dimensional heating elements 33 are here each arranged between a couple of walls 29a, 30b; 29b, 30c; 29c, 30d; 29d, 30a with a direct contact and a contacting area. Furthermore, two heating elements 9e which are also embodied as two-dimensional heating elements 33e extend along the outer surface of the streaming tube 26. The heating elements 9e each extend about the half of the circumference of the streaming tube 26.

Figure 8:
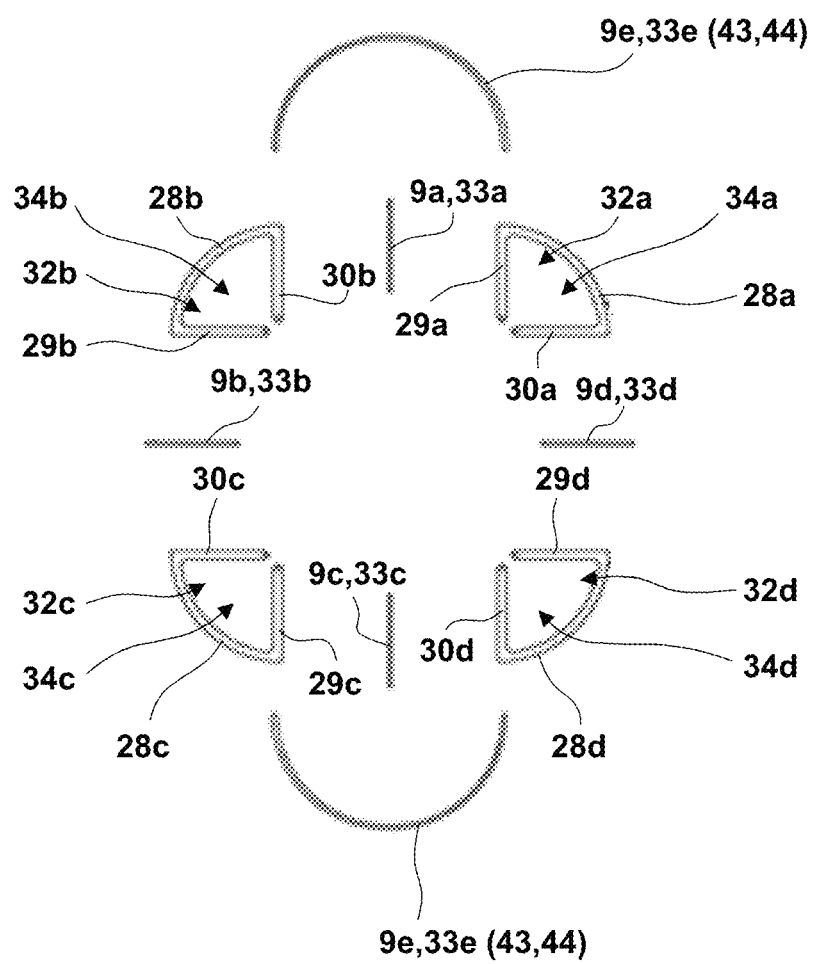
FIG. 8 in an exploded view shows tube segment parts, guiding elements and heating elements of the cabin air inlet module of FIG. 7.

From the exploded view of FIG. 8 it can be seen that for the shown embodiment the streaming channel body 4 is composed of four tube segment parts 34a to 34d. Here, each tube segment part 34 forms a wall 28 of the streaming tube 26 and the walls 29, 30 for the guiding elements 39. Each tube segment part 34 delimits a streaming channel subsection 32. It can be seen in FIG. 8 that the walls 29, 30 of a tube segment part 34 are not connected to each other on the inner sides so that the streaming channel subsections 32 formed by the tube section parts 34 are open on the radial inner side and connected to each other. However, also embodiments are possible wherein the walls 29, 30 are connected to each other on the radial inner side.

Differing from the embodiment described above it is possible that the tube segment parts 34 are also covered by at least one (e.g. semi-shell-shaped) covering body 43 which might serve for connecting single tube segment parts 34 to each other and/or for providing the required mechanical stiffness of the streaming channel body 8 and/or for providing the electrical insulation against breakdown or an acoustic insulation. It is also possible that a heating element 9 embodied as a two-dimensional heating element 33 is arranged between the streaming tube 26 and the covering bodies 43. Finally, it is also possible that by means of semi-shell-shaped forming tools 34 the components of the streaming channel body 9 are connected to each other, pressed with each other or connected to each other by a material bond.

Figure 9:
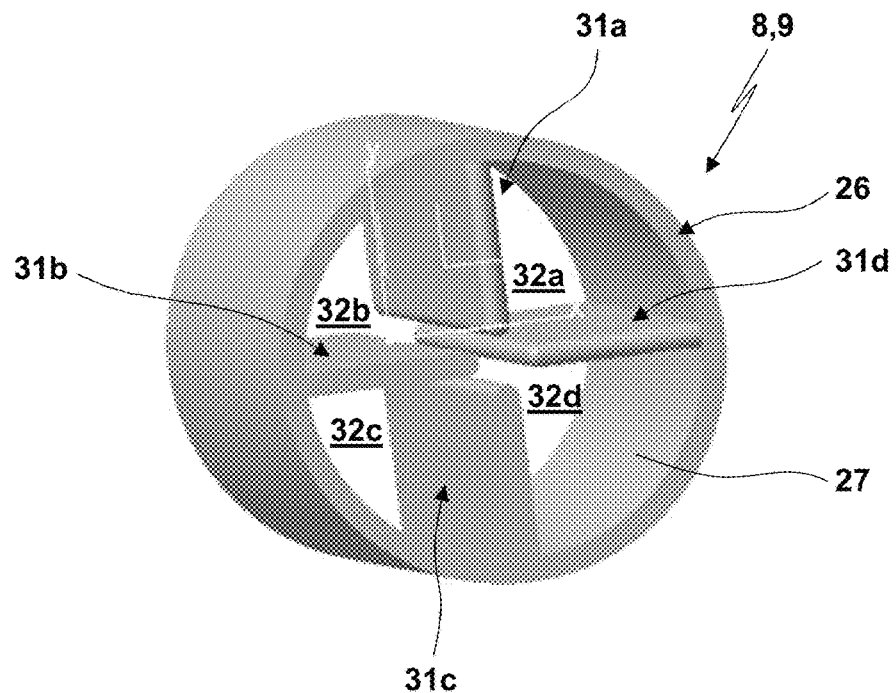
FIG. 9 in a three-dimensional view shows the streaming tube and the tube segment parts of the cabin air inlet module.
Figure 10:
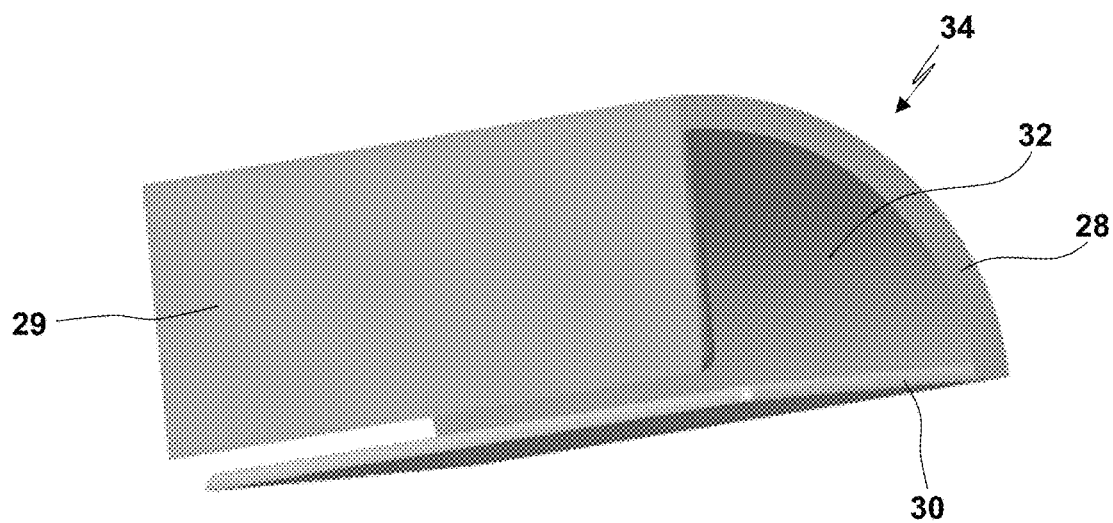
FIG. 10 in a three-dimensional view shows a tube segment part.

FIGS. 9 and 10 in a three-dimensional view show on the one hand the streaming channel body 8 and on the other hand a tube segment subsection 34.

Figure 11:
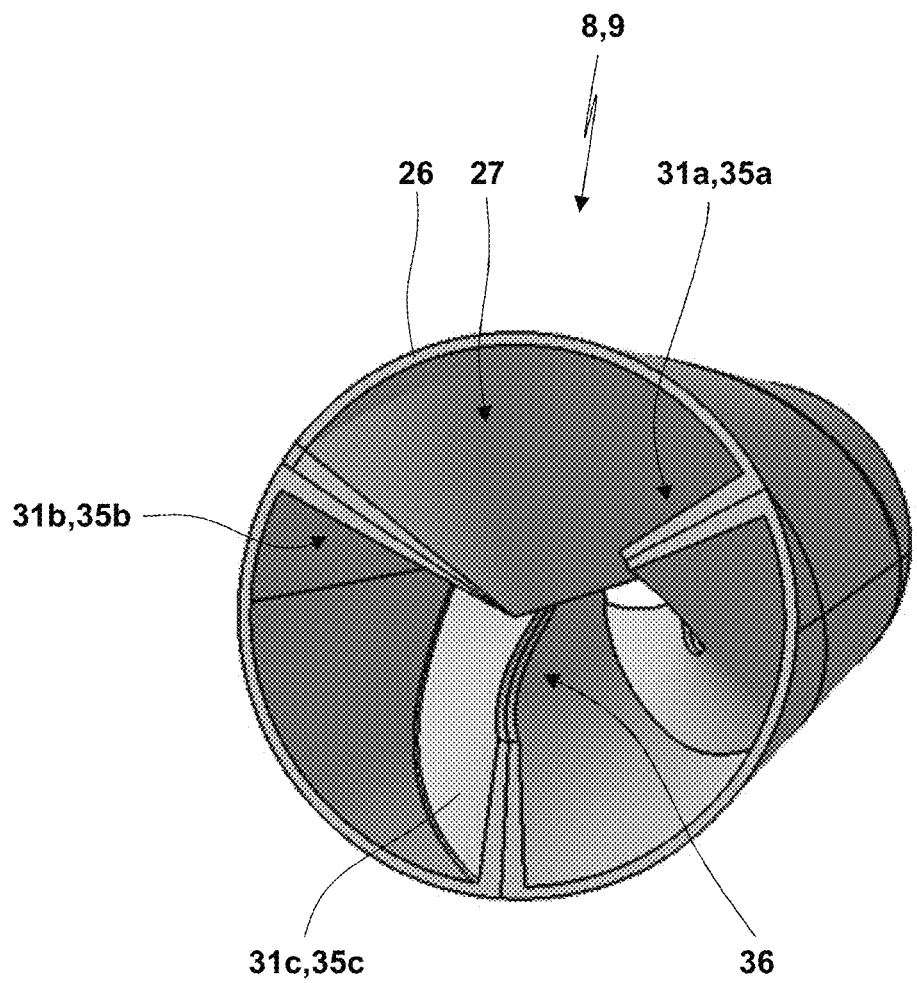
FIG. 11 in a three-dimensional view shows a streaming tube comprising helical guiding elements.

FIG. 11 shows a modified embodiment of a streaming channel body 8 with a heating element 9 integrated therein. Also here a streaming tube 26 is used which comprises guiding elements 31 protruding into an inner cross section 27. However, here the guiding elements 31 do not extend in radial direction and parallel to the longitudinal extension (at least not over the whole longitudinal extension of the streaming channel body 8). Instead, the guiding elements 31 and the associated walls 29, 30 are here formed as spirals or helices 35a, 35b, 35c. Furthermore, the guiding elements 31 have a reduced extension such that there is a clear free transfer cross section 36 between the inner front bases of the guiding elements 31. The free transfer cross section 36 extends continuously in the direction of the longitudinal extension through the streaming channel body 8. In the region of the free transfer cross section 36 incoming air 5 streams axially through the streaming channel body 8 without coming into contact with or being redirected by the guiding elements 31.

Figure 12:
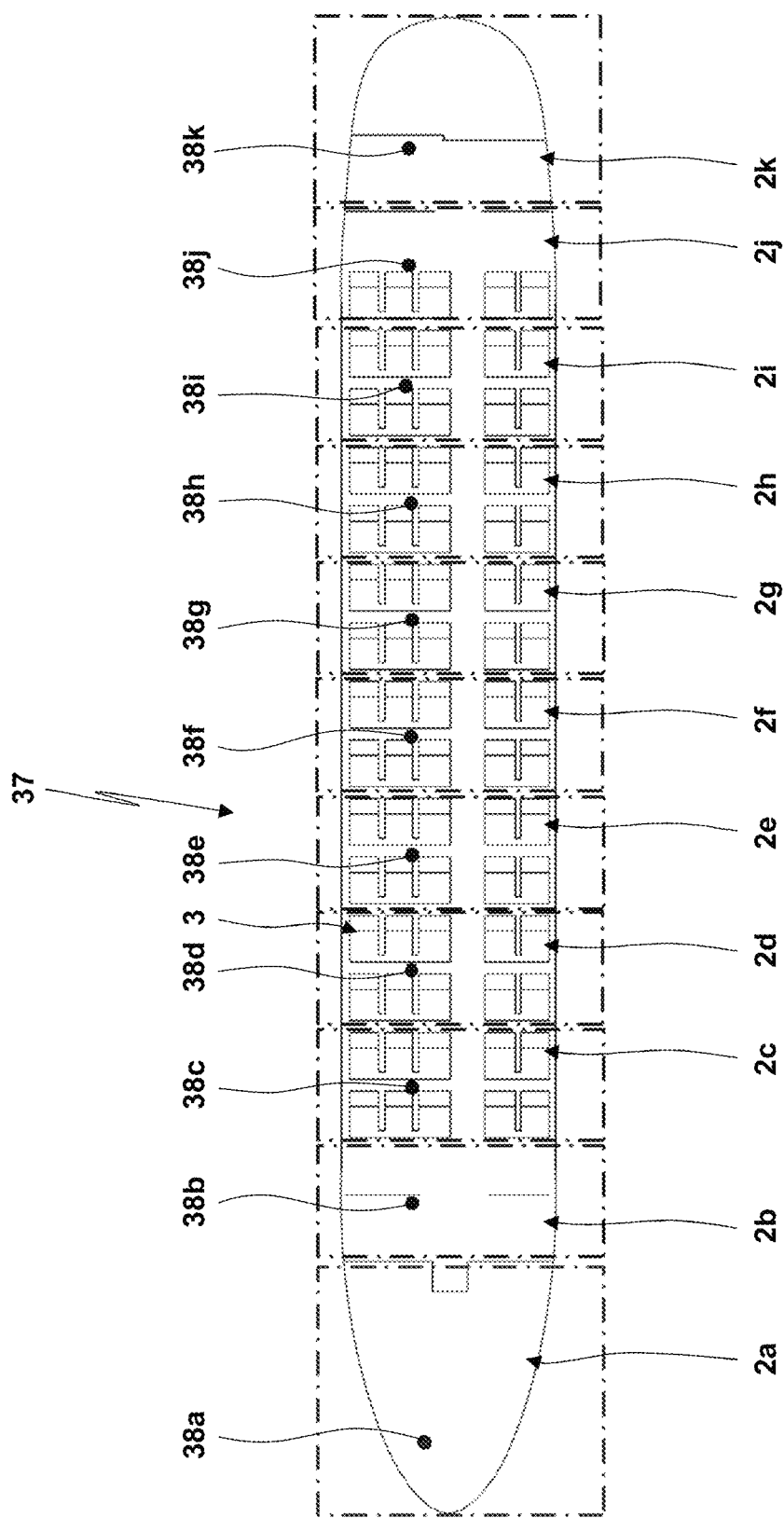
FIG. 12 schematically shows an airplane comprising a cabin and single zones wherein an individual control of the temperature is provided by use of a cabin air inlet module.

FIG. 12 schematically shows an airplane 37 comprising a cabin 3. The cabin 3 is divided in zones 2a to 2k which can be separated from each other so that there is no exchange of cabin air between adjacent zones 2 or which might also be connected to each other so that there is an exchange of cabin air between these. The zone 2a is e.g. a spatially separated cockpit zone whereas the zone 2b is a boarding zone, staff accommodation zone, toilet zone and/or handling zone, the zones 2c to 2j are seating zones for passengers and the zone 2k is a boarding zone, a staff accommodation zone, a toilet zone and/or a handling zone. For the shown embodiment the zones 2c to 2j each comprise two seat rows for passengers on both sides of an aisle. However, within the frame of the invention also any other division of the cabin 3 in single zones 2 is possible.

A cabin air inlet module 16 with associated cabin zone conduit branch 4 and associated inlet opening 6 (if applicable inlet device 7) is associated with each of the zones 2. It is possible that the temperature in each zone 2 is sensed by a temperature sensor 38. In this case the temperature can be transmitted by a line 15 to the control unit 10 and/or a central cabin management system. Differing from the single temperature sensor 38 in each zone 2 as shown in FIG. 12 also a sensor network d arranged close to a passenger or in any other representative position might be use.

It is possible that in a zone 2 a plurality of inlet openings 6i, 6ii, . . . with associated cabin air inlet modules 16i, 16ii, . . . as well as cabin zone conduit branches 4i, 4ii, . . . are provided. In this case preferably the emission of heat by the respective heating elements 9i, 9ii, . . . is controlled for all of the cabin air inlet modules 16i, 16ii, . . . so that by the respective inlet opening 6i, 6ii, . . . incoming air 5i, 5ii, . . . can be provided with the same temperature.

It is possible that differing from the embodiment shown in FIG. 12 a zone 2 comprises only one seat row, more than two seat rows or only a half seat row.

The aim of the open loop control or closed loop control of the heating elements 9 is that e.g. dependent on the heat loads that are not directly measurable and generally irregularly distributed (as in particular due to a varying density of the spatial distribution of the passengers, a varying solar irradiation, a differing heat generation by electronic constructional elements irregularly distributed over the single zones) a predefined temperature in the zone 2 is achieved and upheld.

Figure 13:
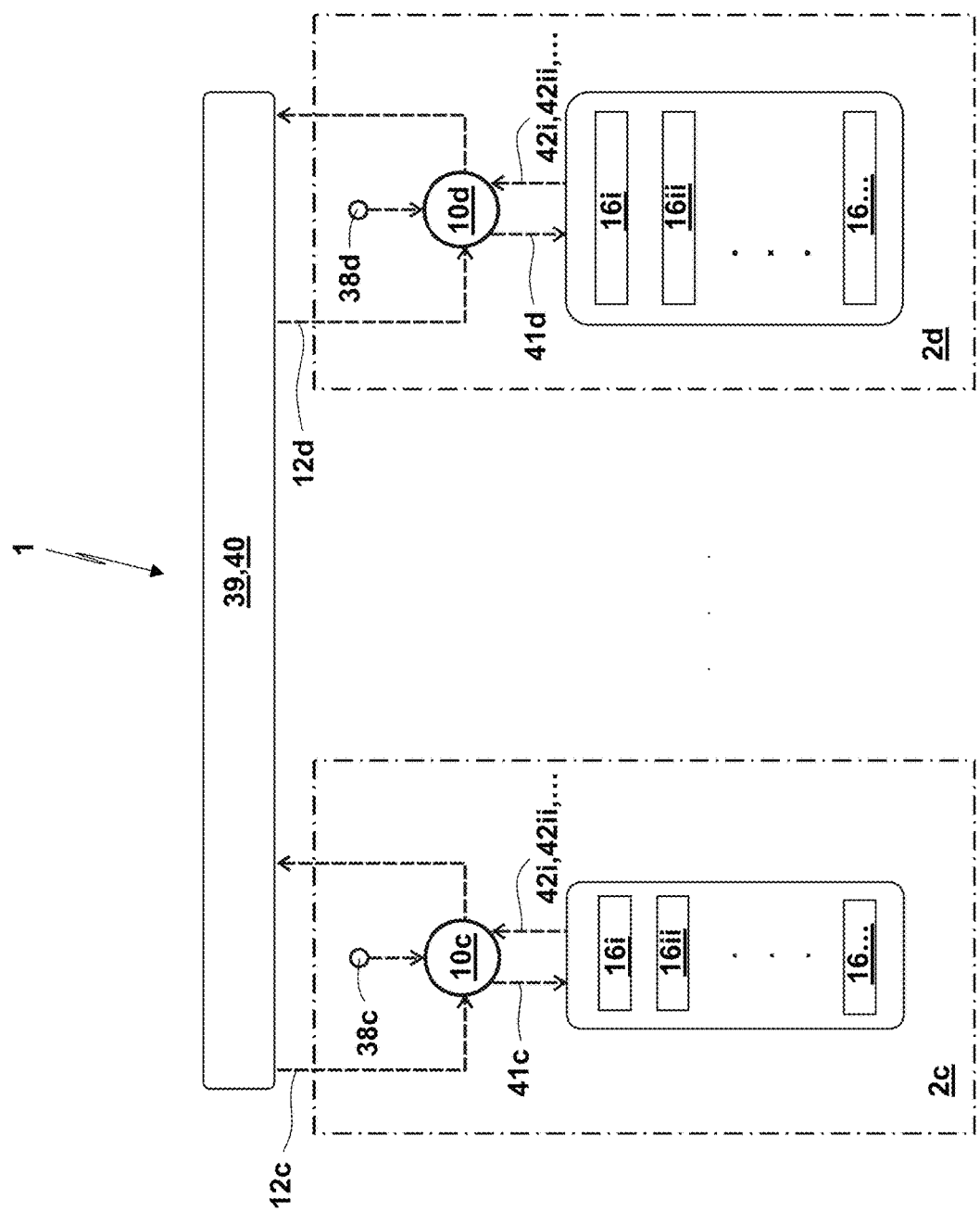
FIG. 13 in a very schematic view shows a cabin air system with the interaction of a cabin management system with control units, heating elements and temperature sensors each associated with single zones for individually controlling the temperatures in the zones.

FIG. 13 shows the interaction of a central cabin management system 39 which comprises an electronic control unit 40 with control units 10, 13 associated with the zones 2. As an example here the interaction of the cabin management system 39 with two zones 2c, 2d is shown where corresponding further zones 2 might interact with the cabin management system 39. Via control lines 12c, 12d the control unit 40 of the cabin management system 39 transmits desired temperatures for the zones 2c, 2d to the control units 10c, 10d. Here, the desired temperatures for the zones 2c, 2d might be the same or differ from each other and the desired temperature might be determined by a suitable algorithms of the control unit 40 where the algorithms might also consider demands of the passengers in the zones 2c, 2d. It is possible that by the lines 12c, 12d also controlling parameters (in particular parameters for a PID control) are transmitted to the control unit 10 where these parameters might be the same for the control unit 10c, 10d or differ from each other. Furthermore, it is possible that the measurement signal of the temperature sensor 38c, 38d associated with the zones 2c, 2d is transmitted to the control unit 10c, 10d. On the basis of the supplied desired temperatures as well as the measurement signals of the temperature sensors 38c, 38d the control unit 10c, 10d determine by use of the control algorithm (in particular a PID control) the required heating powers 41c, 41d of the heating elements 9c, 9d in the zones 2c, 2d. For the shown embodiment the control units 10c, 10d each control a plurality of single inlet openings 6i, 6ii, . . . in the same zone 2c, 2d associated with the cabin air inlet modules 16i, 16ii, . . . with the associated heating elements 9i, 9ii, . . . . Temperature signals 42i, 42ii, . . . which are sensed by the temperature sensors 14i, 14ii, . . . associated with different cabin air inlet modules 16i, 16ii, . . . of the same zone 2c, 2d are transmitted to the control unit 10 so that the control unit is able to consider the temperature signals 42i, 42ii, . . . for the control in the control unit 10 for determining the heating powers 41c, 41d. It is also possible that the control unit 10c, 10d determine different heating powers 41i, 41ii, . . . which then bias the heating element 9i, 9ii, . . . associated with the cabin air inlet modules 16i, 16ii, . . . . It is also possible that not only one single control unit 10c, 10d is each responsible for the control in a zone 2c, 2d but single control units 10i, 10ii, . . . are associated with the cabin air inlet module 16i, 16ii, . . . of the zones 2c, 2d which can then each be integrated into a cabin air inlet module 16i, 16ii, . . . . For a modification it is also possible that the control of the control unit 10c, 10d is integrated into the control unit 40 of the central cabin management system 39.

The present invention e. g. allows a temperature control in the single zones 2 which is fast and fulfills the needs. For the inventive embodiment reductions of the comfort (e.g. in the region of so called "Cold Spots" due to thermal cold bridges, due to draft, due to temporary solar irradiation, due to a seat occupation comprising gaps, due to different emission of heat of electronic devices in the single zones as well as in the region of the entry and the galley of the cabin of the airplane as well as in cold regions of the cockpit) can be avoided.

It is possible that a temperature sensor 38 for sensing the temperature in a zone 2 is arranged in a channel by which at a specific position of the zone cabin air is withdrawn by suction from the zone.

Within the frame of the invention it is possible that each zone 2 comprises an own associated control unit, the single control units then being linked to each other by the cabin management system. Here, it is possible that the control unit which might be formed by the control unit 10 is directly integrated into the cabin air inlet module 16 or mounted to the same or arranged in the region of another available free space and then communicates with the cabin air inlet module 16 or with the heating element 9.

For the inventive cabin air system 1 it is possible that in the zones 2a, 2b, . . . (so at the end of the processing chain of the incoming air) temperature differences of the single inlet opening 6a, 6b, . . . are eliminated or might also be purposefully generated. This allows a local compensation of missing or additional heat loads in the zones 2 of the cabin air 3 or even within the zones 2 and especially a fast control within a small number of cabin air exchange rates because the thermic inertia of the in some cases very long tube conduit system according to the prior art between a mixing valve arranged centrally and inlet openings divided at remote positions over the cabin can be avoided. For embodiments like this, in longitudinal direction of the cabin 3 a significantly finer granularity of the provided heating power or cooling power can be provided, so the provision of a plurality of different temperature zones.

The embodiment of FIGS. 7 to 10 aims for a good homogeneity of the temperature distribution of the incoming air 5 in the streaming cross section. Furthermore, it is intended to provide an area being as large as possible for the heat emission of the heating elements. Furthermore, the embodiment shown here stands out because it is easy to manufacture. A plurality of other streaming profiles are also possible where also two-dimensional surfaces being aerodynamically optimized and having a free shape might be used. The profiles used here, in particular the tube segment parts 34 are directly integrated into the manufacturing process (by injection molding a cover, laminating and the like), are joined or connected to each other by a positive form lock. The heating elements 9 are here assembled in a way such that the heating elements 9 are protected between the tube segment parts 34. However, it is also possible that the heating elements 9 are fixed or mounted to the side of the tube segment parts 34 facing towards the streaming.

A contacting of the heating element might be provided by conventional wires. For an alternative embodiment electric ports for the heating elements 9 might be embedded directly into the streaming channel body 8 or affixed thereto.

For the heating elements 9 a heating paper might be used. Here, e.g. a product "hicoTHERM" (registered trademark) of the company Frenzelit Werke GmbH or heating papers which are used for underfloor heatings or heating walls in the building field can be used.

It is also possible that a heating web is used as heating element 9. A usable heating web is e.g. distributed by the company Sefar AG with the label "PowerHeat" or "PowerHeat NT" (trademarks of the company Sefar AG).

However, it is also possible that a heating varnish is used as the heating element 9. Heating varnishes of this type are e.g. distributed by the company Coating Suiss GmbH or FutureCarbon GmbH (cp. the product distributed under the trademark "Carbo e-term"). Also common heating varnishes for underfloor heaters or heaters in the technical field of passenger cars or heaters for rotor blades of wind power stations might be used.

However, it is also possible that a heating foil is used as heating element 9. Here, industrial mass products can be used or heating foils of the companies Thermo-Technologies, Omega, Graupner/SJ GbmH, Foxpic or a heating foil distributed under the registered trademark "ATT Powerfilm" can be used.

It is possible that a transmission of signals (in particular control signals, measurement signals and also an electric power transmission) is provided via a data bus. It is also possible that signals are transmitted wirelessly.

Preferably the control, the electric power supply of the heating element and the heating element itself are dimensioned such that for an exchange of the cabin air within a zone 2 within 90 seconds a change of the temperature of at least 1°, preferably at least 1.5° or even at least 2° is possible. Preferably, there is no control of the volumetric flow of the incoming air.

It is also possible that a conventional cabin air system 1 is retroactively equipped with the inventive cabin air inlet modules 16 so that a retroactive refitting of an airplane is possible in a way such that the option of an individual control of the temperature of the cabin air in the single zones 2 is provided.

The temperature sensor 14 might e.g. be arranged in a mandrel protruding into the stream of incoming air 5. Preferably, the temperature sensor 14 is arranged at a position downstream with a certain distance from the heating element 9 so that there has already been a good mixing of the incoming air 5 and the temperature sensor 14 senses a representative temperature of the incoming air 5. For a modified embodiment it is possible that according to FIG. 8 there are not four heating elements 9a to 9d used in a planar design. Instead, two couples of heating elements 9a, 9b; 9c, 9d might be each formed by a two-dimensional heating element 33 which is then angled to an L-shape and arranged between adjacent tube segment parts 34. In this way in some cases it is possible to reduce the manufacturing effort and also to reduce the effort for electrically contacting the heating elements 9.

It is possible that a heating element embodied as heating paper is soaked in a temperature-stable resin and then adhered to the tube segment parts 34.

Preferably a heating element 9 (in particular a heating paper) does not comprise an additional insulating layer. Instead, the heating paper can be soaked in a glue or can be adhered by the glue to the tube segment part 34 which provides an insulation against electrical breakdown of at least 500 V.

Preferably the shown components of the cabin air inlet module 16 are exclusively connected to each other by a material bond or exclusively glued to each other. It is possible that a heating element having an own rigidity (in particular a heating paper having an own stiffness) is used which might then directly form a guiding element 31 and might be arranged in the streaming tube 26 protruding in radial inner direction or protruding in any direction into the inner cross section 27.

As a glue used for connecting the heating element 9 to the streaming channel body 8 preferably an epoxy resin is used.

At least one temperature sensor 14 can be arranged in the region of an arm rest, in the floor region, in the region of a back rest, in the region of a head rest or in the region of a television set that can be hinged down. It is also possible that the temperature sensor is embodied as a two-dimensional sensor integrated into a structural element as e.g. a lateral shell planking or lateral cover so that the temperature sensor in some cases does not sense a punctual temperature but an integral temperature value. Furthermore, it is possible that the control unit processes and/or analyzes a signal of a seat occupation sensor. A measurement signal of this type can then be transmitted to the control unit 10 so that the seat occupation and so the heat emission of the passengers can be considered in the control.

In some cases in the zones above the wings a different control (in particular with different control parameters for a PID-control) is used than in other zones because in the zones in the region of the wings in some cases there is a stronger heat convection.

It is possible that the electric heating element 9 embodied as a two-dimensional heating element 33 is a heating foil having a low weight. Preferably, the heating foil has a weight per area of less than 100 g/m² or even smaller than 90 g/m². The operating voltage of the heating foil might correspond to the on-board voltage of the airplane. The heating foil might comprise carbon fibers that are not woven with each other which form heating resistances embedded into a thermoplastic matrix. In the case that as the thermoplastic matrix a material as PEEK is used regulations for the combustibility and the resistance against media can be fulfilled in a simple way. The power emission of the heating elements and so of the cabin air inlet module is preferably dimensioned such that for a flow rate of at least 4 l/s, at least 5 l/s, at least 6 l/s or a flow rate on the region of 6 l/s to 7 l/s the cabin air inlet module is able to increase the temperature of the incoming air 5 by up to 5 K. For an alternative or cumulative embodiment it is possible that the dimensioning is chosen such that a temperature difference in the amount of 1-2 K can be achieved within two air exchange rates (180 s).

The invention also proposes a particular type of control of the cabin air inlet module of a cabin air system:

For a first control concept in the zone associated with a cabin air inlet module a plurality of temperatures is sensed by a plurality of temperature sensors arranged within the zone. The control of the heating element of the cabin air inlet module is then performed on the basis of a mean value of the temperatures measured by the temperature sensors. The temperature sensors might e. g. be arranged at different seat positions in a seat row of the zone and/or in different heights of a seat. For a differing control concept the control of the heating power of the heating element of the cabin air inlet module is performed on the basis of a weighted mean value of the temperatures which are measured by the temperature sensors arranged in the zones. So, it is e.g. possible that temperature sensors are arranged in different heights or at different positions relative to the passengers arranged in the zones. Then, a weighting of the measured temperatures might reflect the influence of the temperature at a specific position upon the feeling of the passenger. Alternatively or cumulatively it is possible that the control of a heating element of a cabin air inlet module is not only performed on the basis of at least one temperature sensor which is arranged in the zone associated with the cabin air inlet module. Instead, it is also possible that measured temperatures of temperature sensors are considered which are arranged adjacent to the zone wherein the cabin air inlet module is arranged. It is e.g. possible that first temperature sensors measure the temperatures in the zone wherein the cabin air inlet module is arranged where this zone e.g. is a seat row N. Second temperature sensors then measure the temperatures in an adjacent zone which is e.g. a seat row N−1. Finally, third temperature sensors measure the temperatures in another adjacent zone which might e.g. be a seat row N+1. From the temperatures which have been measured by the first temperature sensors, the second temperature sensors and the third temperature sensors then a weighted mean vale of a temperature is generated on the basis of which then the heating element of the cabin air inlet module is controlled. For the before mentioned example the weighting of the measurement signals of the first temperature sensors might e.g. be 50%, whereas the weighting of the temperatures of the second and third temperature sensors might be 25%. In this way the control does not only consider the influence of the heat emission of the cabin air inlet module into the zone but also a heat exchange of the controlled zone with adjacent zones. It can be understood that then also a corresponding control of the cabin air inlet module of the adjacent zones might be performed.

Many variations and modifications may be made to the preferred embodiments of the invention without departing substantially from the spirit and principles of the invention. All such modifications and variations are intended to be included herein within the scope of the present invention, as defined by the following claims.

We claim:

1. A cabin air inlet module comprising
  a) a streaming channel body having at least one streaming channel and at least one wall, the at least one wall limiting the at least one streaming channel so that incoming air passing through the streaming channel body for being supplied to a cabin is guided by the at least one wall, the streaming channel body comprising a plurality of tube segment parts, each of the plurality of tube segment parts comprising:
    aa) an outer wall having a shape of a segment of a hollow cylinder, and
    ab) a first radial wall and a second radial wall extending from the outer wall in an inner direction, the first radial wall and the second radial wall forming at least one guiding element for guiding the incoming air through the streaming channel body, the at least one wall comprising at least one of the outer wall, the first radial wall or the second radial wall,
  b) an electric heating element by which it is possible to heat the incoming air,
  c) the electric heating element being a two-dimensional heating element which extends along the at least one wall, wherein the two-dimensional heating element comprises at least one of a flat heating element that extends along the at least one wall or a curved heating element that extends along the at least one wall.

2. The cabin air inlet module of claim 1, wherein the two-dimensional heating element:
  a) comprises a first element portion that extends along a first axis of the first radial wall and a second element portion that extends along a second axis of the second radial wall or
  b) contacts the at least one wall and establishes a two-dimensional contact area with the at least one wall.

3. The cabin air inlet module of claim 2, wherein the at least one guiding element is arranged in an inner cross section of the streaming tube.

4. The cabin air inlet module of claim 3, wherein the at least one guiding element which is arranged in the inner cross section of the streaming tube has a shape of a spiral or helix.

5. The cabin air inlet module of claim 4, wherein at a location interior from the at least one guiding element which has the shape of a helix or spiral a free transfer cross section is provided.

6. The cabin air inlet module of claim 3, wherein the at least one guiding element separates streaming channel subsections from each other.

7. The cabin air inlet module of claim 6, wherein the streaming tube and the at least one guiding element which is arranged in the inner cross section of the streaming tube are formed by the plurality of tube segment parts.

8. The cabin air inlet module of claim 7, wherein the plurality of tube segment parts are arranged within at least one outer body or covering body.

9. The cabin air inlet module of claim 1, wherein the electric heating element is arranged between the first radial wall of a first tube segment part and the second radial wall of a second tube segment part, the electric heating element contacting the same or is connected to the same by a material bond.

10. The cabin air inlet module of claim 7, wherein the electric heating element
   a) is arranged between two walls formed from adjacent tube segment parts and
   b) contacts the two walls or is connected to the same by a material bond.

11. The cabin air inlet module of claim 8, wherein the electric heating element is arranged between a tube segment part of the plurality of tube segment parts and the at least one outer body or the covering body and contacts the same or is connected to the same by a material bond.

12. The cabin air inlet module of claim 1, wherein the streaming channel body is manufactured from an extruded polycarbonate material.

13. The cabin air inlet module of claim 3, wherein the streaming tube is manufactured from an extruded polycarbonate material.

14. The cabin air inlet module of claim 7, wherein the plurality of tube segment part are manufactured from an extruded polycarbonate material.

15. The cabin air inlet module of claim 1, wherein a plurality of components of the cabin air inlet module are partly or exclusively connected to each other by a material bond or by an adhesive.

16. The cabin air inlet module of claim 1, wherein the electric heating element is embodied as
   a) a heating mat or
   b) a heating varnish.

17. The cabin air inlet module of claim 10, wherein the electric heating element is embodied as
   a) a heating mat or
   b) a heating varnish.

18. The cabin air inlet module of claim 11, wherein the electric heating element is embodied as
   a) a heating mat or
   b) a heating varnish.

19. The cabin air inlet module of claim 16, wherein the heating mat is coated by a material or embedded into a material which comprises an insulation against electrical breakdown of at least 500V.

20. The cabin air inlet module of claim 17, wherein the heating mat is coated by a material or embedded into a material which comprises an insulation against electrical breakdown of at least 500V.

21. The cabin air inlet module of claim 18, wherein the heating mat is coated by a material or embedded into a material which comprises an insulation against electrical breakdown of at least 500V.

22. The cabin air inlet module of claim 1, wherein the streaming channel body is covered by an insulating material.

23. The cabin air inlet module of claim 1, wherein the electric heating element extends in and along the streaming channel body with a length between 20 mm and 200 mm.

24. The cabin air inlet module of claim 10, wherein the electric heating element extends in and along the streaming channel body with a length between 20 mm and 200 mm.

25. The cabin air inlet module of claim 11, wherein the electric heating element extends in and along the streaming channel body with a length between 20 mm and 200 mm.

26. The cabin air inlet module of claim 1, wherein the cabin air inlet module comprises a sensor.

27. The cabin air inlet module of claim 1, wherein the cabin air inlet module comprises an electronic control unit which under consideration of a signal of a temperature sensor performs a control of an electric bias of the electric heating element for providing a desired temperature of the incoming air streaming out of the cabin air inlet module or of a zone of a cabin.

28. The cabin air inlet module of claim 27, wherein the cabin air inlet module comprises an inlet by which it is possible to connect the electronic control unit to a control unit of a cabin management system for setting the desired temperature.

29. The cabin air inlet module of claim 27, wherein the cabin air inlet module comprises a port by which it is possible to connect the cabin air inlet module to a temperature sensor which is arranged in a zone of the cabin which is supplied with incoming air by the cabin air inlet module.

30. The cabin air inlet module of claim 27, wherein the electronic control unit comprises control logic or an ON-OFF switching element which performs an ON-OFF control of the electric heating element.

31. The cabin air inlet module of claim 27, wherein the electronic control unit comprises control logic by which a proportional integral-derivative (PID) control of the heating element is performed.

32. The cabin air inlet module of claim 27, wherein the electronic control unit comprises control logic by which a performed control considers at least one of the group consisting of
   a) a signal of a seat occupation sensor,
   b) a distribution of occupations of seats,
   c) a signal from an infrared camera which captures a zone associated with the cabin air inlet module,
   d) a signal from a fitness capturing device and/or health capturing device of a passenger and
   e) a manual demand of a temperature by a passenger.

33. The cabin air inlet module of claim 27, wherein the temperature sensor is arranged downstream from the electronic heating element.

34. A cabin air inlet module for a cabin of an airplane comprising
   a) a streaming channel body,
   b) an electric heating element by which it is possible to heat incoming air streaming through the streaming channel body,
   c) the electric heating element being a two-dimensional heating element that has at least one of a flat heating element or a curved heating element,
   d) the streaming channel body comprising
      da) a streaming tube having a plurality of tube segment parts, the plurality of tube segment parts comprising an outer wall limiting a streaming channel, the outer wall being a segment of a cylindrical shape of the streaming tube and
      db) an inner wall which is arranged and extends from the outer wall to an interior of the streaming tube and which forms a guiding element for the incoming air and separates streaming channel subsections from each other in circumferential direction, and
   e) the two-dimensional heating element extending along the inner wall.

35. A cabin air system comprising a plurality of cabin air inlet modules that comprise the cabin air inlet module of claim 27,
   a) the cabin air inlet modules each being associated with a respective zone of a cabin of an airplane,
   b) the cabin air inlet modules each being arranged with a distance from an associated inlet opening into the associated zone, the distances being smaller than 150 cm and
   c) a respective control unit being associated with each at least one of the cabin air inlet modules, the respective control unit units communicating with a central control unit of a cabin management system.

\* \* \* \* \*